(12) United States Patent
Durocher

(10) Patent No.: US 6,407,400 B1
(45) Date of Patent: Jun. 18, 2002

(54) HIGH EFFICIENCY MODULATOR

(75) Inventor: Hector R. Durocher, Nashua, NH (US)

(73) Assignee: BAE Systems Information and Electronic Systems Integration, Inc., Nashua, NH (US)

( * ) Notice: Subject to any disclaimer, the term of this patent is extended or adjusted under 35 U.S.C. 154(b) by 0 days.

(21) Appl. No.: 05/678,018

(22) Filed: Apr. 19, 1976

(51) Int. Cl.⁷ .............................. G01J 1/00; H04K 3/00; G02B 26/02

(52) U.S. Cl. ................ 250/504 R; 250/526; 250/495.1; 359/111; 359/235

(58) Field of Search .................................. 350/272, 273, 350/274, 347, 348, 350, 351, 353, 354, 355, 343, 504, 511, 512, 513; 240/1.2, 22, 46.03, 46.05, 46.43; 340/25, 27 NA, 366 B, 366 D, 366 F; 250/504 R, 526, 495.1; 359/111, 233, 234, 235

(56) References Cited

U.S. PATENT DOCUMENTS 1,686,525 A * 10/1928 House .................... 350/272 X

FOREIGN PATENT DOCUMENTS

DE 2350479 * 4/1975 ................. 250/343

* cited by examiner

*Primary Examiner*—Stephen C. Buczinski
(74) *Attorney, Agent, or Firm*—Daniel J. Long

(57) ABSTRACT

Apparatus for efficiently modulating the output from an infrared radiation source is provided by a collector/collimator for collecting and collimating the output of the radiation source and a modulator including a stator and at least one rotor. The stator includes a disc of alternating opaque and transparent radial segments having means associated therewith for gathering the radiation from the source and passing substantially all of it to the transparent segments including optical wedges arranged on the opaque segments and a central reflector/collector. The rotor includes a disc of alternating transparent and opaque radial segments. A second rotor may be provided for adding a second modulation and comprises a disc of alternating opaque and transparent radial segments also having optical wedges arranged on the opaque segments and a central reflector.

9 Claims, 1 Drawing Sheet

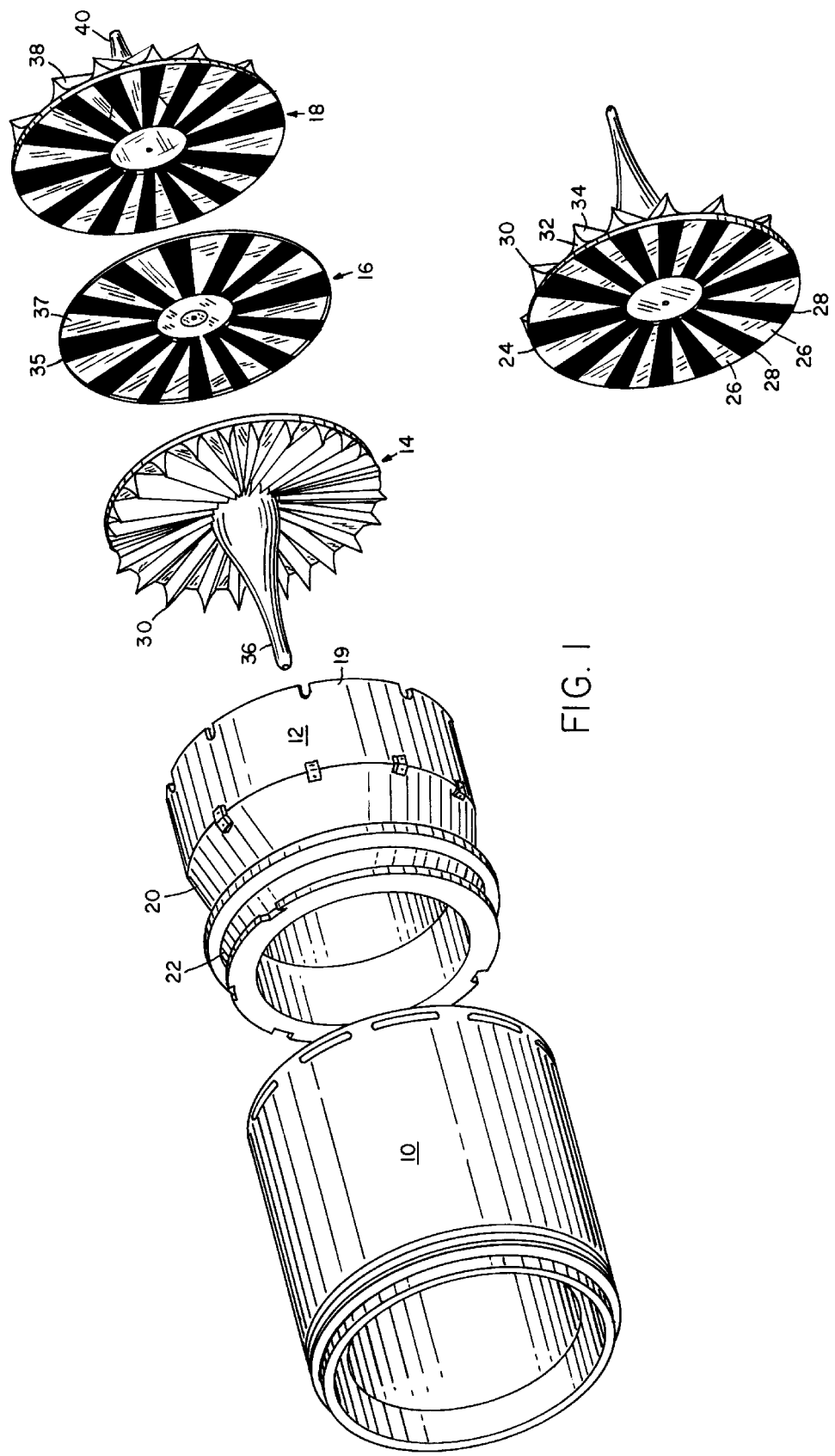

HIGH EFFICIENCY MODULATOR

BACKGROUND OF THE INVENTION

Modulated infrared sources are employed to countermeasure heat seeking missiles which home in on the heat generating portions of a target such as the engines of an airplane. These modulated infrared sources must produce a signal of sufficiently high intensity compared to that generated by the target.

Certain of such modulated infrared sources include a single large source for producing ample amounts of infrared energy and at least two modulating elements, at least one of which is rotating, to intercept the output from the source so as to provide modulation thereof. These modulating elements are discs comprising alternating transparent and opaque radial segments. One of the modulating elements (the stator) is disposed with respect to the source to block a predetermined amount of the radiation from the source at all times and the other alternately blocks and passes the remaining radiation passing the first modulating element. This type of modulated infrared source is, relatively inefficient since even at the modulation peaks substantially one half of the available energy from the source is rejected (blocked).

SUMMARY OF THE INVENTION

Accordingly, it is an object of this invention to provide improved means for modulating the output from an infrared radiation source.

It is another object of this invention to provide a more efficient means for modulating the output from an infrared source.

Briefly, in one embodiment apparatus for more efficiently modulating an infrared radiation source comprises a collecting member for collecting and collimating the output from an infrared radiation source and applying it to the stator assembly of a modulator. The stator assembly includes a disc of alternating opaque and transparent radial segments having a plurality of optical wedges disposed on the opaque segments of the disc and further having a reflecting and collimating needle disposed in the center of the disc. The needle reflects source energy which normally would be absorbed by obscuration and the optical wedges re-image the source through discrete apertures rather than reflecting energy back to the source. This energy is directed to a first rotating element. The rotor comprises a disc having alternating transparent and opaque radial segments to alternately pass or block the radiation received from the stator. A further modulation can be imposed on the output from the aforementioned rotor assembly by a second rotor assembly which is preferably constructed in very much the same fashion as the stator.

BRIEF DESCRIPTION OF THE DRAWINGS

The above-mentioned and other features and objects of this invention will become more apparent by reference to the following description taken in conjunction with the accompanying drawings, in which:

FIG. 1 is an exploded view of apparatus for modulating the output from a radiant source; and FIG. 2 is a perspective view of the stator assembly of the apparatus of FIG. 1.

DESCRIPTION OF PREFERRED EMBODIMENT

Referring now to FIG. 1 of the drawings there is illustrated thereby apparatus for efficiently modulating the output from an infrared radiation source 10. The modulating means comprises a collecting element 12, a stator 14, a first rotor 16 and a second rotor 18. Collector 12 collects and collimates the radiation emitted from the source 10 and directs it to the stator 14. Collector 12, as shown, is shaped such that the section 19 thereof nearest the stator 14 is substantially cylindrical while the sections 20 and 22 are sectional paraboloids (consisting of two discrete conics). In the embodiment shown, sectional paraboloid 20 makes an angle of approximately ten degrees with respect to a lateral cut through cylindrical portion 19 while paraboloid section 22 makes an angle of approximately twenty degrees from the lateral cut through the portion of paraboloid 20 nearest the source 10. However, this particular design is merely representative and many other configurations could be used, for example, the portions 20 and 22 could comprise a single continuous curve, for example, a pure paraboloid.

Stator 14, which is illustrated in FIG. 1, is also illustrated in FIG. 2 wherein the side thereof furthermost from the source 10 is shown in greater detail. It comprises a disc 24 having a plurality of radial segments 26 and 28 thereon. Segments 26 are transparent to the radiation from source 10 at the radiation bands of interest while segments 28 are opaque at the radiation bands of interest. An optical wedge 30 is disposed on each of the opaque segments 28 of stator 14. In this embodiment the sides 32 and 34 of the wedges 30 are preferably sections of cylindrical ellipses which are truncated close to the focus of the ellipse, however, other configurations will also provide improved efficiency. Preferably, 10 for optimized throughput of energy the radii of the truncation sections are varied linearly as any cut through a cone. The wedges 30 re-image. the source energy through the transparent segments 26 of the stator, rather than reflecting this energy back to the source, thus, greatly increasing the radiometric output of the modulator. A needle 36 is disposed in the center of stator 14 and reflects source energy which normally would be absorbed by obscuration. Needle 36 is preferably a pure or slightly modified cone. The wedges 30 abut the needle 36. In order to achieve maximum reflectivity in the band of interest all exposed surfaces of wedges 30, needle 36 and collector 12 are polished and gold plated.

Rotor 16 is comprises of alternating opaque and transparent radial segments 35 and 37 and is rotated by a motor (not shown) which is preferably mounted inside the needle 36. Rotor 16 is connected to the motor by a shaft (also not shown). To maximize transmission it is preferred that the edges of the rotor 16 be polished. Rotor 16 provides high speed or carrier modulation.

Disposed outside of the rotor 16 is a second rotor element 18 which is configured very much like stator 14 in that it is made up of alternating opaque and transparent sections and has optical wedges 38 disposed on the opaque segments. It also has a center needle 40. The wedges and needle in this case are employed to maximize on-axis radiation. In this case the needle is truncated since the additional length is unnecessary. Rotor 18 is driven by a motor (not shown) disposed within center needle 40. Rotor 18 supplies low speed or spin modulation and also recollimates the output from the stator 14.

The optical wedges occasion much more energy being emitted by modulator to provide superior jam to signal capability. They also reshape the energy allowing different waveforms to be emitted by the modulator. Without the wedges the output from the modulator would be substantially a triangular configuration. However, employing the wedges the wave shapes can take the form of anything from a trapazoid to a near sine wave. By changing the optical radii of the truncated sections making up the wedges the lobe patterns emitted may be greatly altered to suit particular applications.

While I have described above the principles of my invention in connection with specific apparatus, it is to be clearly understood that this description is made only by way of example and not as a limitation of the scope of my invention as set forth in the accompanying claims.

I claim:

1. Apparatus for efficiently modulating the output of a radiant source, comprising:
   a first disc having a plurality of alternating transparent and opaque segments with said opaque segments including a like plurality of optical wedges for diverting the output of the radiant source through the transparent segments;
   a needle disposed in the center of said first disc; and
   a second disc rotatable with respect to said first disc and having a plurality of alternating transparent and opaque segments.

2. Apparatus as defined in claim 1 wherein said optical wedges have sides which are configured substantially as sections of cylindrical ellipses truncated near the focus of the ellipse.

3. Apparatus as defined in claim 1 wherein said needle is substantially conical in configuration.

4. Apparatus as defined in claim 1 wherein said wedges abut said needle.

5. Apparatus defined in claim 1, further including a collecting element surrounding said first disc for collecting and collimating the radiation emitted by the source and directing it to said first disc.

6. Apparatus as defined in claim 5 wherein the exposed surfaces of said wedges, said needle and said collecting element are polished and gold plated.

7. Apparatus as defined in claim 1, further including a third disc which is rotatable and having a plurality of alternating transparent and opaque segments.

8. Apparatus as defined in claim 7, said third disc having a plurality of optical wedges arranged on the opaque segments thereof.

9. Apparatus as defined in claim 8, further including a second needle disposed in the center of said third disc.

* * * * *